United States Patent
Kim

(10) Patent No.: US 11,676,112 B2
(45) Date of Patent: Jun. 13, 2023

(54) METHOD, SYSTEM, AND NON-TRANSITORY COMPUTER-READABLE RECORD MEDIUM FOR ADDING DIARY TO CALENDAR

(71) Applicant: LINE Plus Corporation, Seongnam-si (KR)

(72) Inventor: Young Hyuk Kim, Seongnam-si (KR)

(73) Assignee: LINE PLUS CORPORATION, Gyeonggi-do (KR)

( * ) Notice: Subject to any disclaimer, the term of this patent is extended or adjusted under 35 U.S.C. 154(b) by 0 days.

(21) Appl. No.: 17/185,078

(22) Filed: Feb. 25, 2021

(65) Prior Publication Data

US 2021/0264379 A1 Aug. 26, 2021

(30) Foreign Application Priority Data

Feb. 26, 2020 (KR) ........................ 10-2020-0023707

(51) Int. Cl.
*G06Q 10/1093* (2023.01)
*H04L 51/02* (2022.01)

(52) U.S. Cl.
CPC ......... *G06Q 10/1095* (2013.01); *H04L 51/02* (2013.01)

(58) Field of Classification Search
None
See application file for complete search history.

(56) References Cited

U.S. PATENT DOCUMENTS

| | | | |
|---|---|---|---|
| 2007/0300164 A1* | 12/2007 | Bhogal | G06Q 10/107 715/753 |
| 2013/0297317 A1* | 11/2013 | Lee | G10L 17/00 704/270.1 |
| 2016/0330158 A1* | 11/2016 | Gonzales | H04L 51/216 |
| 2018/0255177 A1* | 9/2018 | Scott | H04M 3/436 |

FOREIGN PATENT DOCUMENTS

KR 10-0867266 B1 11/2008

* cited by examiner

*Primary Examiner* — Kevin S Mai
(74) *Attorney, Agent, or Firm* — Harness, Dickey & Pierce, P.L.C.

(57) ABSTRACT

A diary addition method, as well as a system, and a non-transitory computer-readable record medium implementing the diary addition method, including providing an interface for selecting data included in a messaging platform in response to an input of a diary creation request for a specific period in a calendar; and creating a diary document based on data selected through the interface and adding the diary document to the calendar in association with the specific period may be provided.

20 Claims, 13 Drawing Sheets

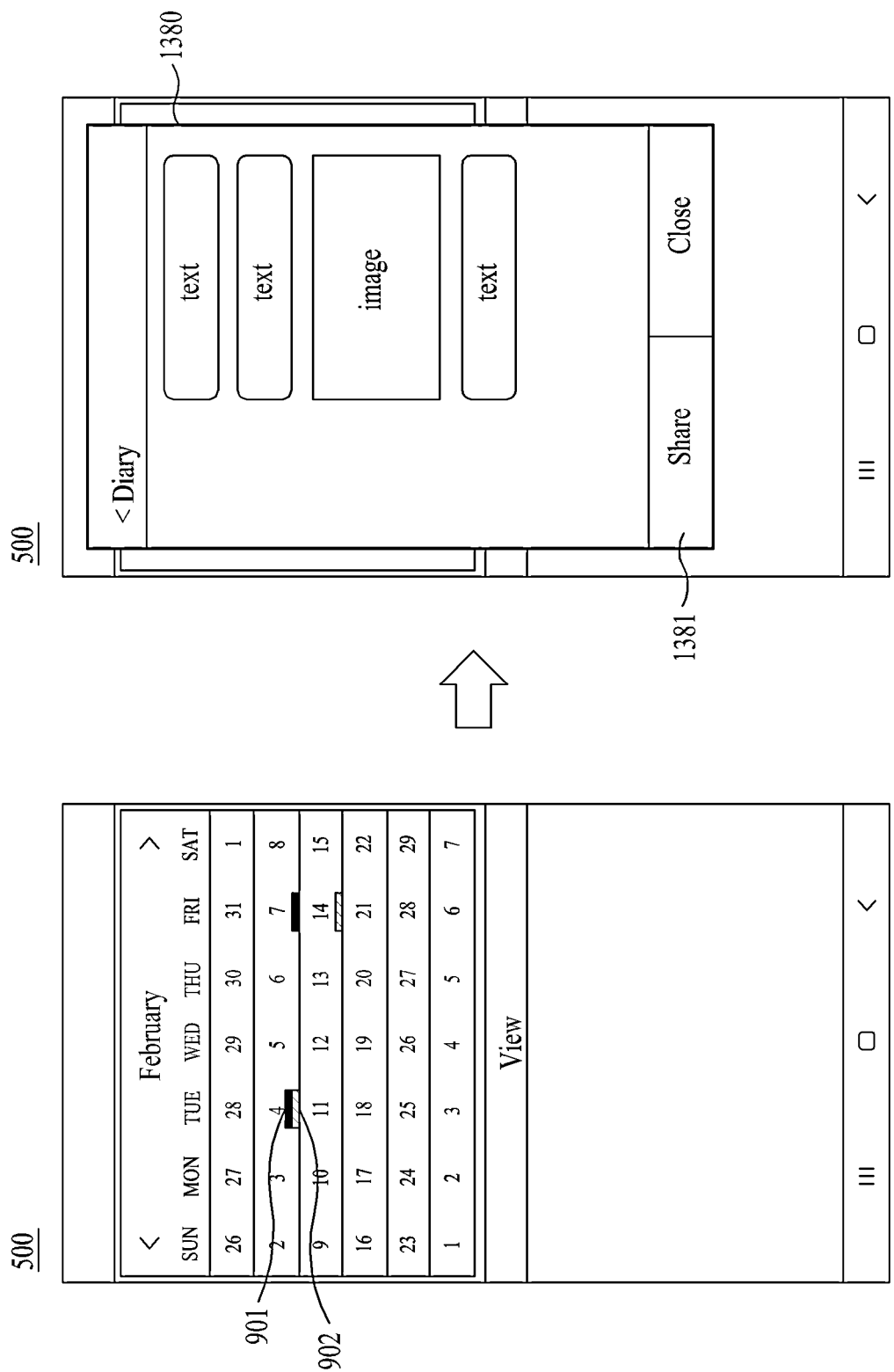

METHOD, SYSTEM, AND NON-TRANSITORY COMPUTER-READABLE RECORD MEDIUM FOR ADDING DIARY TO CALENDAR

CROSS-REFERENCE TO RELATED APPLICATION(S)

This U.S. non-provisional application and claims the benefit of priority under 35 U.S.C. § 119 to Korean Patent Application No. 10-2020-0023707, filed Feb. 26, 2020, the entire contents of which are incorporated herein by reference in their entirety.

BACKGROUND

Technical Field

One or more example embodiments relate to technology for providing a calendar function for schedule management.

Related Art

With the development in communication technology, the use of Internet services, such as, for example, e-commerce, Internet banking, and online game services, is becoming common.

Currently, a plurality of schemes about a schedule linkage between the Internet and various types of terminals is introduced.

For example, a method and system for providing schedule information that may collect schedule information about a target a user is interested in on the Internet, may convert the collected schedule information to schedule information implementable on a terminal of a user, and may provide the converted schedule information are introduced.

SUMMARY

Some example embodiments may link a diary document created based on data included in a messaging platform to a calendar for schedule management.

Some example embodiments may provide a calendar capable of managing schedules created in all of chatrooms of a messenger at a single location.

Some example embodiments may share a calendar of a user or a portion of the schedule with another user.

Some example embodiments may verify calendars of a user and another user and may provide a free time in which schedules of corresponding members do not overlap each other when the user determines the schedule with the other user through a messenger.

Some example embodiments may automatically register, to a calendar, a schedule of a user registered to an affiliate platform linked to a messenger.

Some example embodiments may add a chatbot linked to a calendar to a messenger and may provide notification or recommendation information about a schedule.

According to an aspect of at least one example embodiment, there is provided a diary addition method performed by a computer apparatus including at least one processor configured to execute computer-readable instructions included in a memory. The diary addition method includes, by the at least one processor, providing an interface for selecting data included in a messaging platform in response to an input of a diary creation request for a specific period in a calendar, and creating a diary document based on data selected through the interface and adding the diary document to the calendar in association with the specific period.

The providing may include displaying data exchanged through the messaging platform in the specific period, and providing the interface for selecting data desired to be included in the diary document from among the displayed data.

The providing may include selecting a messaging platform through which data is exchanged in the specific period or a messaging platform in which the specific period is described from among one or more messaging platforms, and providing the interface for selecting data within the selected messaging platform.

The providing may include providing the interface, which includes at least one of a first interface for individually selecting data included in the messaging platform based on a data unit and a second interface for capturing a portion of a screen on which data is displayed.

The creating may include creating the diary document by sorting the data selected through the interface by data type or by sorting the data selected through the interface based on data selection order or data timeline information.

The diary addition method may further include sharing, by the at least one processor, at least one diary document among diary documents added to the calendar through the messaging platform.

The diary addition method may further include recognizing, by the at least one processor, an input of a keyword as a calendar call event and providing a schedule registration form, in response to the input of the keyword related to a schedule through the messaging platform.

The providing a schedule registration form may include registering a member included in the messaging platform as a participant of the schedule.

The providing a schedule registration form may include verifying a calendar of each member included in the messaging platform and providing a free time in which schedules of corresponding registered members do not overlap each other.

The providing a schedule registration form may include analyzing data corresponding to a period of time based on a point in time at which the calendar call event is recognized and providing recommendation information about a period to be registered to the schedule.

The diary addition method may further include adding, by the at least one processor, a chatbot linked to the calendar, to the messaging platform.

The chatbot may be configured to provide a notification message about the schedule registered to the calendar through the messaging platform.

The chatbot may be configured to analyze a desired pattern of the schedule registered to the calendar and provide a message that recommends registration of the schedule having the desired pattern through the messaging platform.

According to an aspect of at least one example embodiment, there is provided a non-transitory computer-readable record medium storing instructions that, when executed by a processor, cause a computer apparatus including the processor to perform the aforementioned diary addition method.

According to an aspect of at least one example embodiment, there is provided a computer apparatus including at least one processor configured to execute computer-readable instructions included in a memory. The at least one processor is configured to cause the computer apparatus to provide an interface for selecting data included in a messaging platform in response to an input of a diary creation request for a specific period in a calendar, create a diary document based on data selected through the interface, and add the diary document to the calendar in association with the specific period.

Further areas of applicability will become apparent from the description provided herein. The description and specific examples in this summary are intended for purposes of illustration only and are not intended to limit the scope of the present disclosure.

BRIEF DESCRIPTION OF DRAWINGS

FIGS. 10 and 11 illustrate examples of a user interface screen for describing a process of registering a schedule through linkage to a messaging platform according to at least one example embodiment; and FIGS. 12 and 13 illustrate examples of a user interface screen for describing a process of sharing a calendar through a messaging platform according to at least one example embodiment.

DETAILED DESCRIPTION

Figure 1:
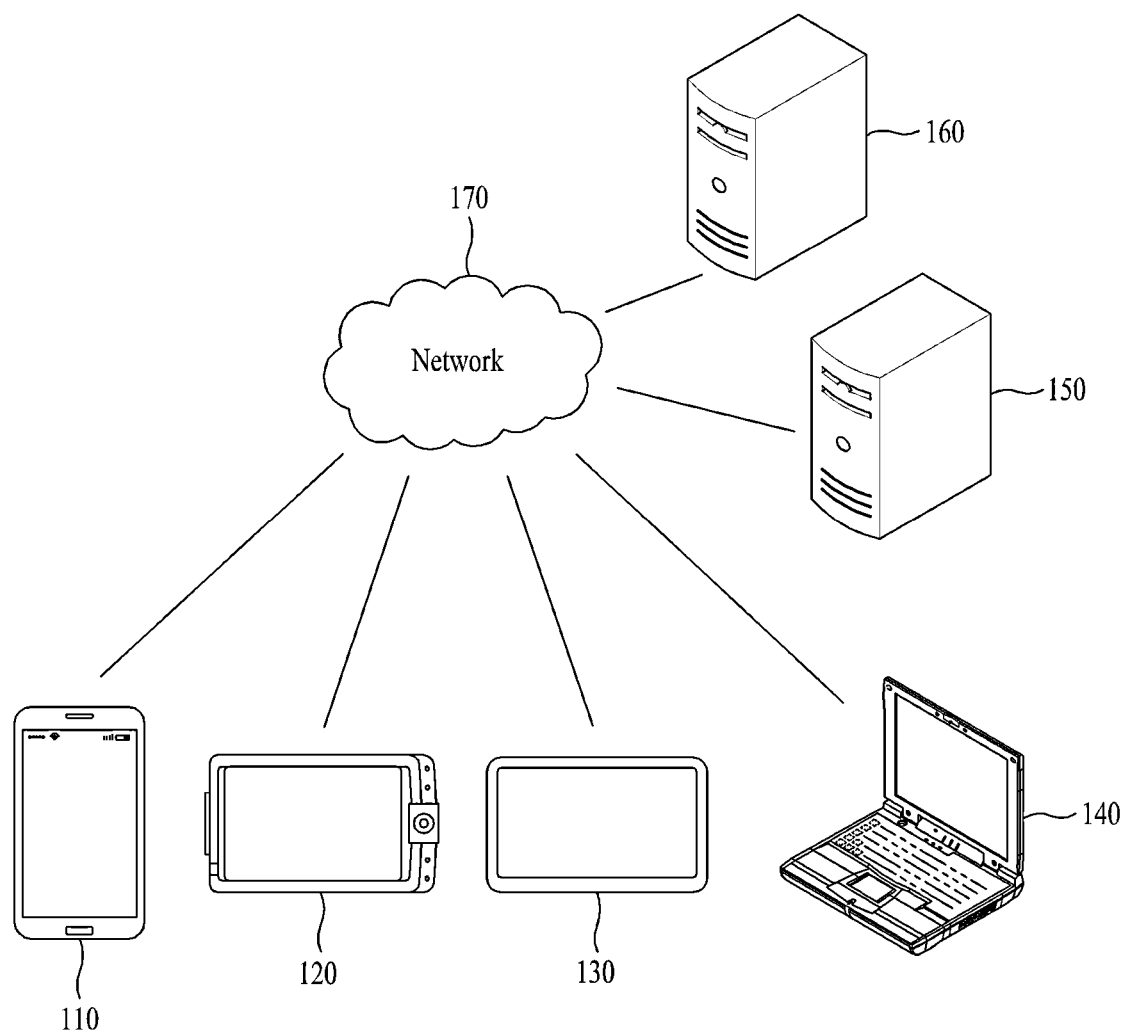
FIG. 1 is a diagram illustrating an example of a network environment according to at least one example embodiment.

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, some example embodiments will be described with reference to the accompanying drawings.

The example embodiments relate to technology for providing a calendar function for a schedule management.

The example embodiments including the disclosures described herein may link a diary document created based on data included in a messaging platform to a calendar for a schedule management.

FIG. 1 illustrates an example of a network environment according to at least one example embodiment. Referring to FIG. 1, the network environment may include a plurality of electronic devices 110, 120, 130, and 140, a plurality of servers 150 and 160, and a network 170. FIG. 1 is provided as an example only. A number of electronic devices or a number of servers is not limited thereto.

Each of the plurality of electronic devices 110, 120, 130, and 140 may be a fixed terminal or a mobile terminal that is configured as a computer apparatus. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), a tablet PC, a game console, a wearable device, an Internet of things (IoT) device, a virtual reality (VR) device, an augmented reality (AR) device, and the like. For example, although FIG. 1 illustrates a shape of a smartphone as an example of the electronic device 110, the electronic device 110 used herein may refer to one of various types of physical computer apparatuses capable of communicating with other electronic devices 120, 130, and 140, and/or the servers 150 and 160 over the network 170 in a wireless or wired communication manner. The communication scheme is not limited and may include a near field wireless communication scheme between devices as well as a communication scheme using a communication network (e.g., a mobile communication network, wired Internet, wireless Internet, a broadcasting network, a satellite network, etc.) includable in the network 170. For example, the network 170 may include at least one of network topologies that include a personal area network (PAN), a local area network (LAN), a campus area network (CAN), a metropolitan area network (MAN), a wide area network (WAN), a broadband network (BBN), and Internet. Also, the network 170 may include at least one of network topologies that include a bus network, a star network, a ring network, a mesh network, a star-bus network, a tree or hierarchical network, and the like. However, they are provided as examples only.

Each of the servers 150 and 160 may be configured as a computer apparatus or a plurality of computer apparatuses that provides an instruction, a code, a file, content, a service, etc., through communication with the plurality of electronic devices 110, 120, 130, and 140 over the network 170. For example, the server 150 may be a system that provides a first service to the plurality of electronic devices 110, 120, 130, and 140 connected over the network 170. The server 160 may be a system that provides a second service to the plurality of electronic devices 110, 120, 130, and 140 connected over the network 170. In detail, the server 150 may provide, as the first service, a service (e.g., a calendar service) intended by an application through the application as a computer program installed and executed on the plurality of electronic devices 110, 120, 130, and 140. As another example, the server 160 may provide, as the second service, a service that distributes a file for installing and executing the application to the plurality of electronic devices 110, 120, 130, and 140.

Figure 2:
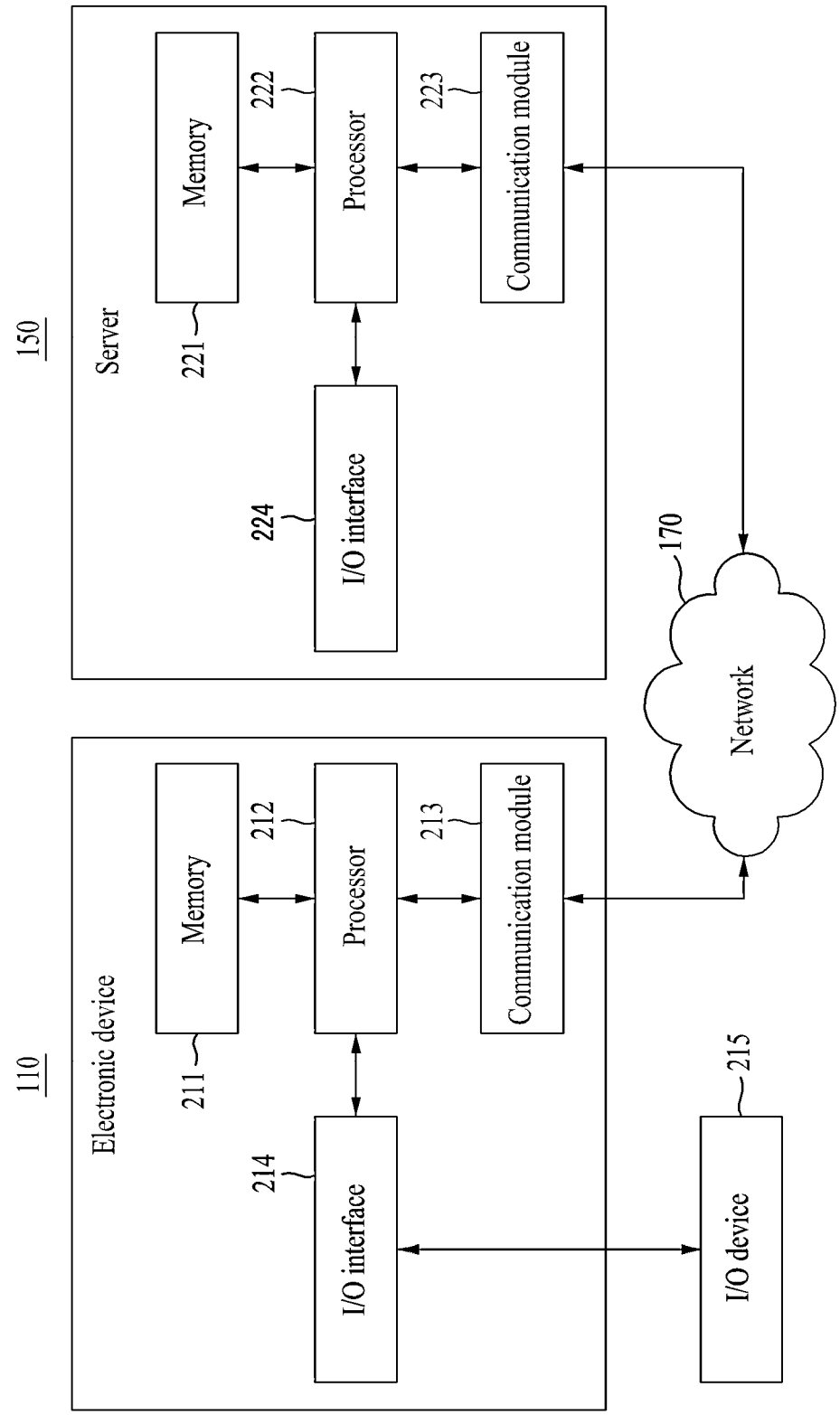
FIG. 2 is a diagram illustrating an example of an electronic device and a server according to at least one example embodiment.

FIG. 2 is a block diagram illustrating an example of an electronic device and a server according to at least one example embodiment. Description is made using the electronic device 110 as an example of an electronic device and the server 150 as an example of a server with reference to FIG. 2. Also, the other electronic devices 120, 130, and 140 or the server 160 may have the same or similar configuration as that of the electronic device 110 or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as random access memory (RAM), a read only memory (ROM), a disk drive, a solid state drive (SSD), a flash memory, etc., as a non-transitory computer-readable record medium. The permanent mass storage device, such as ROM, SSD, flash memory, and disk drive, may be included in the electronic device 110 or the server 150 as a permanent storage device separate from the memory 211, 221. Also, an OS and at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, providing an installation file of the application.

The processor 212, 222 may be configured to process instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 110 and the server 150 over the network 170 and may provide a function for communication between the electronic device 110 and/or the server 150 and another electronic device, for example, the electronic device 120 or another server, for example, the server 160. For example, the processor 212 of the electronic device 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the permanent storage device, further includable in the electronic device 110.

The I/O interface 214 may be a device used for interface with an I/O apparatus 215. For example, an input device may include a device, such as a keyboard, a mouse, a microphone, a camera, etc., and an output device may include a device, such as a display, a speaker, a haptic feedback device, etc. As another example, the I/O interface 214 may be a device for interface with an apparatus in which an input function and an output function are integrated into a single function, such as a touchscreen. The I/O apparatus 215 may be configured as a single device with the electronic device 110. Also, the I/O interface 224 of the server 150 may be a device for interface with an apparatus (not shown) for input or output that may be connected to the server 150 or included in the server 150. In detail, when the processor 212 of the electronic device 110 processes an instruction of a computer program loaded to the memory 211, content or a service screen configured based on data provided from the server 150 or the electronic device 120 may be displayed on the display through the I/O interface 214.

According to other example embodiments, the electronic device 110 and the server 150 may include a number of components greater than or less than a number of components shown in FIG. 2. However, there is no need to clearly illustrate many components according to the related art. For example, the electronic device 110 may include at least a portion of the I/O apparatus 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an acceleration sensor, a gyro sensor, a camera module, various physical buttons, a button using a touch panel, an I/O port, a vibrator for vibration, etc., which are generally included in the smartphone.

Hereinafter, some example embodiments of a method and system for adding a diary to a calendar are described.

Figure 3:
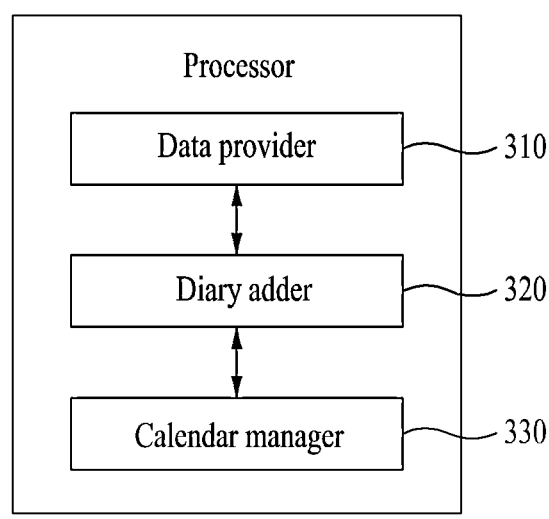
FIG. 3 is a diagram illustrating an example of components includable in a processor of an electronic device according to at least one example embodiment.
Figure 4:
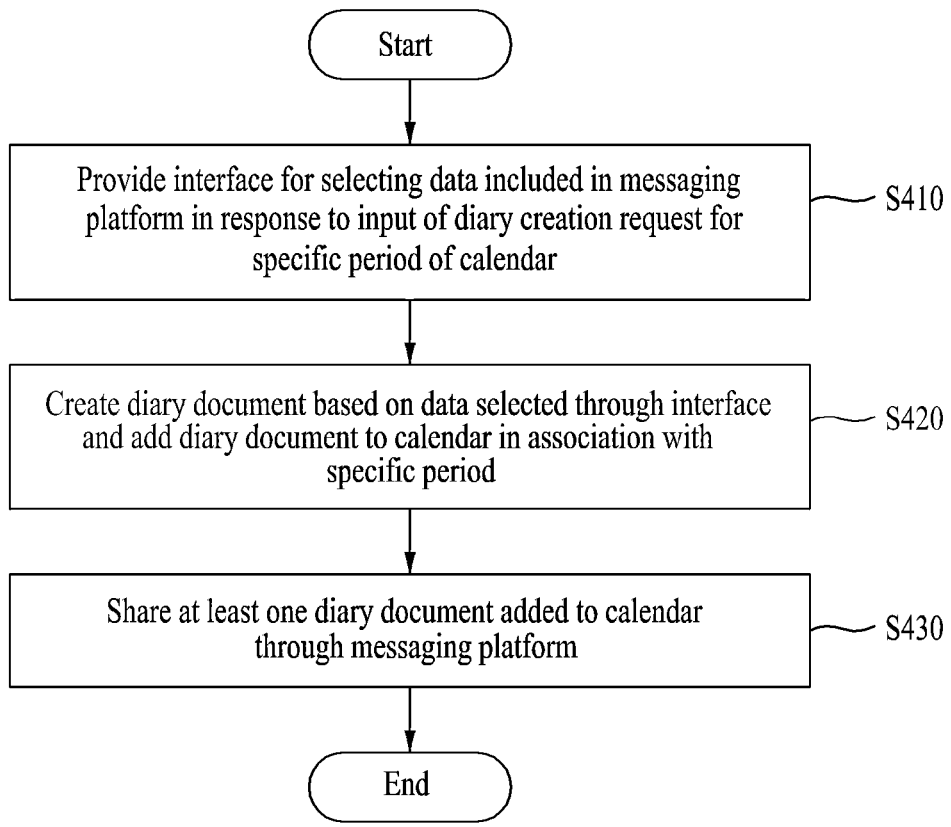
FIG. 4 is a flowchart illustrating an example of a method performed by an electronic device according to at least one example embodiment.

FIG. 3 is a diagram illustrating an example of components includable in a processor of an electronic device according to at least one example embodiment, and FIG. 4 is a flowchart illustrating an example of a method performed by an electronic device according to at least one example embodiment.

A diary addition system implemented as a computer may be configured in the electronic device 110 according to the example embodiment. For example, the diary addition system may be configured in a form of an independently operating program or may be configured in an in-app form of a specific application to be operable on the specific application. Depending on example embodiments, a calendar service may be provided through interaction with the server 150.

The diary addition system configured in the electronic device 110 may perform the diary addition method of FIG. 4 in response to an instruction provided from an application installed on the electronic device 110.

Referring to FIG. 3, to perform the diary addition method of FIG. 4, the processor 212 of the electronic device 110 may include a data provider 310, a diary adder 320, and a calendar manager 330. Depending on example embodiments, the components of the processor 212 may be selectively included in or excluded from the processor 212. Also, depending on example embodiments, the components of the processor 212 may be separated or merged for representations of functions of the processor 212.

The processor 212 and the components of the processor 212 may control the electronic device 110 to perform operations 5410 to 5430 included in the diary addition method of FIG. 4. For example, the processor 212 and the components of the processor 212 may be configured to execute an instruction according to a code of at least one program and a code of an OS included in the memory 211.

Here, the components of the processor 212 may be representations of different functions of the processor 212 performed by the processor 212 in response to an instruction provided from the program code stored in the electronic device 110, for example, an instruction provided from the application executed on the electronic device 110. For example, the data provider 310 may be used as a functional representation of the processor 212 that controls the electronic device 110 to provide data included in a messaging platform in response to the instruction.

The processor 212 may read a desired instruction from the memory 211 to which instructions associated with control of the electronic device 110 are loaded. In this case, the read instruction may include an instruction for controlling the processor 212 to perform the following operations 5410 to 5430.

Referring to FIG. 4, in operation 5410, when a period is specified in a calendar by the user of the electronic device 110 and a diary creation request for the specific period of the calendar is input, the data provider 310 may provide a user interface for selecting data included in a messaging platform.

The messaging platform may include, for example, a chatroom, a timeline, and a content storage box of a messenger, and may refer to any types of messaging platforms on the electronic device 110 linkable to the calendar as well as the messenger and a text service, such as, for example, a short messaging service (SMS) and a multimedia messaging service (MMS). Data included in the messaging platform may include any types of communicable data using the messaging platform, such as, for example, a text-based chat message and/or various types of contents, such as a photo, a video, a file, and a contact.

For example, the data provider 310 may select (or display) data exchanged through the messaging platform in the specific period from data included in the messaging platform and may provide an interface capable of selecting data desired to include in a diary document within the selected data. As another example, the data provider 310 may select a messaging platform through which data is exchanged in the specific period from among messaging platforms and may provide an interface for selecting data within the selected messaging platform. As another example, the data provider 310 may analyze data included in a messaging platform, may select a messaging platform that includes the specific period (e.g., a messaging platform in which the specific period is described) from among messaging platforms, and may provide an interface for selecting data within the selected messaging platform. Here, if a plurality of messaging platforms are present, the data provider 310 may provide an interface in a structure of initially selecting a single messaging platform from among the plurality of messaging platforms and selecting data in the selected messaging platform. In some example embodiments, the data provider 310 may provide an interface in a structure of classifying data included in a messaging platform for each data type, initially selecting a data type and selecting data based on the selected data type. A data selection interface may include an interface capable of individually selecting data included in the messaging platform based on a data unit and an interface capable of selecting data by capturing a portion of a screen on which data of the messaging platform is displayed. Further, the data selection interface may include an interface for directly inputting other contents, such as a title of a diary, based on a text, a voice, or an image in addition to a data selection and an interface for attaching various types of files to a document.

Therefore, if the user of the electronic device 110 desires to add a diary of a specific period to the calendar, the data provider 310 may provide an interface capable of selecting data included in a messaging platform through interaction with the messaging platform.

In operation 5420, the diary adder 320 may create a diary document based on data selected through the interface provided in operation 5410 and may add the corresponding diary document to the calendar in association with the specific period selected by the user. The diary adder 320 may create a document based on data selected by the user from the data included in the messaging platform and may add the corresponding document to the calendar as the diary of the specific period. The diary document refers to a document that includes data selected through a user interface and may be created by combining the data based on a desired (or alternatively, preset) criterion. For example, the diary adder 320 may create the diary document by classifying and sorting data selected through the user interface by data type, or by sorting the data in order in which the data is selected through the user interface or by sorting the data based on timeline information (e.g., a message transmission/reception time) of the data itself.

In operation 5430, the calendar manager 330 may share at least one diary document among diary documents added to the calendar through the messaging platform in response to a request from the user of the electronic device 110. The calendar manager 330 may provide a function of sharing the diary document added to the calendar. For example, the calendar manager 330 may share the diary document added to the calendar with another user included in a corresponding chatroom through the chatroom of the messenger.

In response to an input of a keyword related to a schedule through the messaging platform through interaction with the messaging platform, the calendar manager 330 may recognize the corresponding input of the keyword as a calendar call event and may provide a schedule registration form. The user may call a calendar system by inputting the keyword related to the schedule in the messaging platform and may register the schedule to the calendar through the provided schedule registration form. The calendar manager 330 may analyze a previous message of a desired period of time, for example, 1 hour, based on a point in time, at which the calendar call event is recognized, and may provide recommendation information about a period to be registered to the schedule based on a message including a time or a date. For example, the calendar manager 330 may automatically recommend a period from February 5 to February 8 as a period to be registered to a schedule based on a message of February 3, "I'm on vacation for four days from the day after tomorrow."

If the user desires to enter the calendar and register a schedule through the messaging platform, the calendar manager 330 may automatically register a member included in the messaging platform as a participant of the corresponding schedule. For example, the calendar manager 330 may verify a calendar of each member registered as a participant of the schedule through interaction with the server 150 and may provide a free time in which schedules of corresponding registered members do not overlap each other. When the user enters the calendar and selects a period for registering the schedule through the messaging platform, the calendar manager 330 may verify a schedule of each member for each unit time zone of the corresponding period and may display a free time in which an overlapping schedule is absent between the members. To verify the free time, prior permission needs to be acquired from members to share the calendar. If the permission to share the calendar is not acquired from at least one member, the calendar manager 330 does not operate the corresponding function with a notification message according to a refusal to share the calendar in response to a request for verifying the free time.

If a member included in the messaging platform is registered as a participant of the schedule, the calendar manager 330 may forward the corresponding schedule to participants and may receive at least one of accept, hold, and refuse as a response to the schedule from each of the participants and may manage the same with the corresponding schedule.

The calendar manager 330 may share at least one of schedules registered to the calendar through the messaging platform in response to a request from the user of the electronic device 110. The calendar manager 330 may provide a function of sharing the schedule registered to the calendar. For example, the user may share the schedule registered to the calendar with another user included in the chatroom of the messenger through the chatroom.

The calendar manager 330 may automatically register, to the calendar, schedule information registered on a corresponding affiliate platform through interaction with at least one affiliate platform through the messaging platform. For example, if schedule information (e.g., airline, lodging, hospital, and/or performance) related to the user is created on an affiliate platform, a notification message about a corresponding schedule may be displayed on the messaging platform and the schedule included in the notification message displayed on the messaging platform may be automatically added to the calendar.

The calendar manager 330 may add a chatbot linked to the calendar to the messaging platform and may provide notification or recommendation information about the schedule through the corresponding messaging platform. For example, the calendar manager 330 may provide a notification message with respect to a schedule of which a notification time is set among schedules registered to the calendar through the messaging platform at a desired (or alternatively, preset) time before the corresponding schedule starts. As another example, the calendar manager 330 may analyze a pattern of a schedule registered to the calendar and may recommend the user to register a schedule having a specific pattern to the calendar. For example, if the user registers a study schedule several times at 2 O'clock on Saturdays every other week, the calendar manager 330 may estimate the next study schedule at 2 O'clock on Saturday every other week and may output a message to recommend the user to register the same as a schedule. Here, the message may include an interface for inputting the intent of accept. If the user inputs the intent of accept through the interface, the schedule with the same content may be automatically registered to the estimated period according to the pattern analysis.

FIGS. 5 to 9 illustrate examples of a user interface screen for describing a calendar function according to at least one example embodiment.

FIGS. 5 to 9 illustrate a calendar screen 500, which may be a screen displayed on a display of the electronic device 110.

Figure 5:
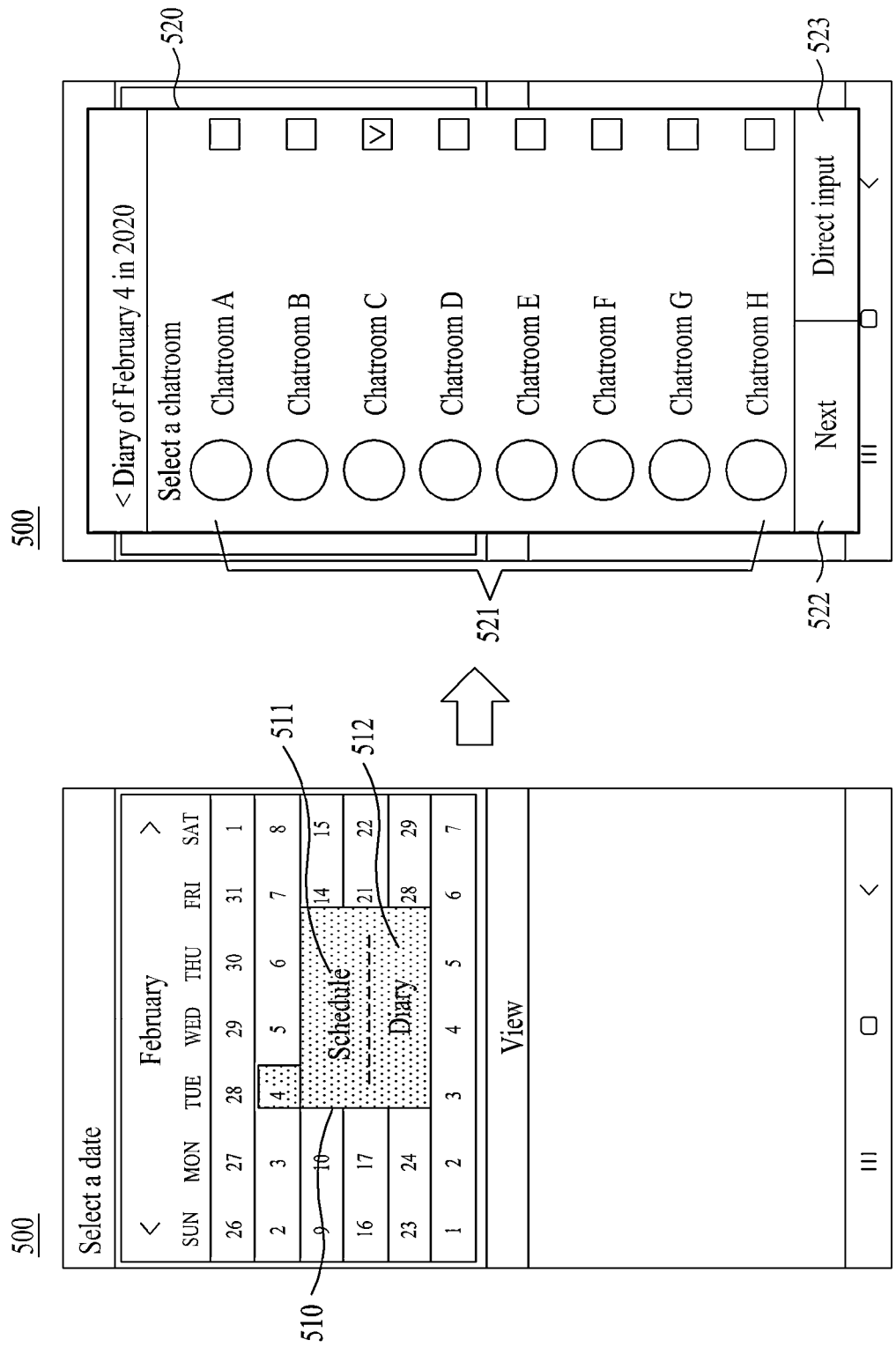
FIGS. 5 to 9 illustrate examples of a user interface screen for describing a calendar function according to at least one example embodiment.

Referring to FIG. 5, the calendar screen 500 may include a user interface capable of selecting a date. In response to a selection on a specific date on the calendar screen 500, the processor 212 may display a menu list 510 of executable menus. The menu list 510 may include a "schedule" menu 511 for registering a schedule to a calendar and a "diary" menu 512 for adding a diary to the calendar.

In response to a selection on the "diary" menu 512, the processor 212 may provide a user interface for selecting data exchanged through a messaging platform.

For example, referring to FIG. 5, in response to a selection on the "diary" menu 512, the processor 212 may provide a chatroom selection screen 520 for selecting a chatroom of a messenger. The chatroom selection screen 520 may include a chatroom list 521. Here, the chatroom list 521 may include the entire chatrooms of the messenger. As another example, the chatroom list 521 may include a chatroom in which a message is exchanged on a date selected on the calendar screen 500, among chatrooms of the messenger. As another example, the chatroom list 521 may include a chatroom that includes a date selected on the calendar screen 500 among the chatrooms of the messenger. The chatroom selection screen 520 may include a "next" menu 522 for moving to a chatroom selected from the chatroom list 521 and a "direct input" menu 523 for directly inputting content without using a chatroom.

Figure 6:
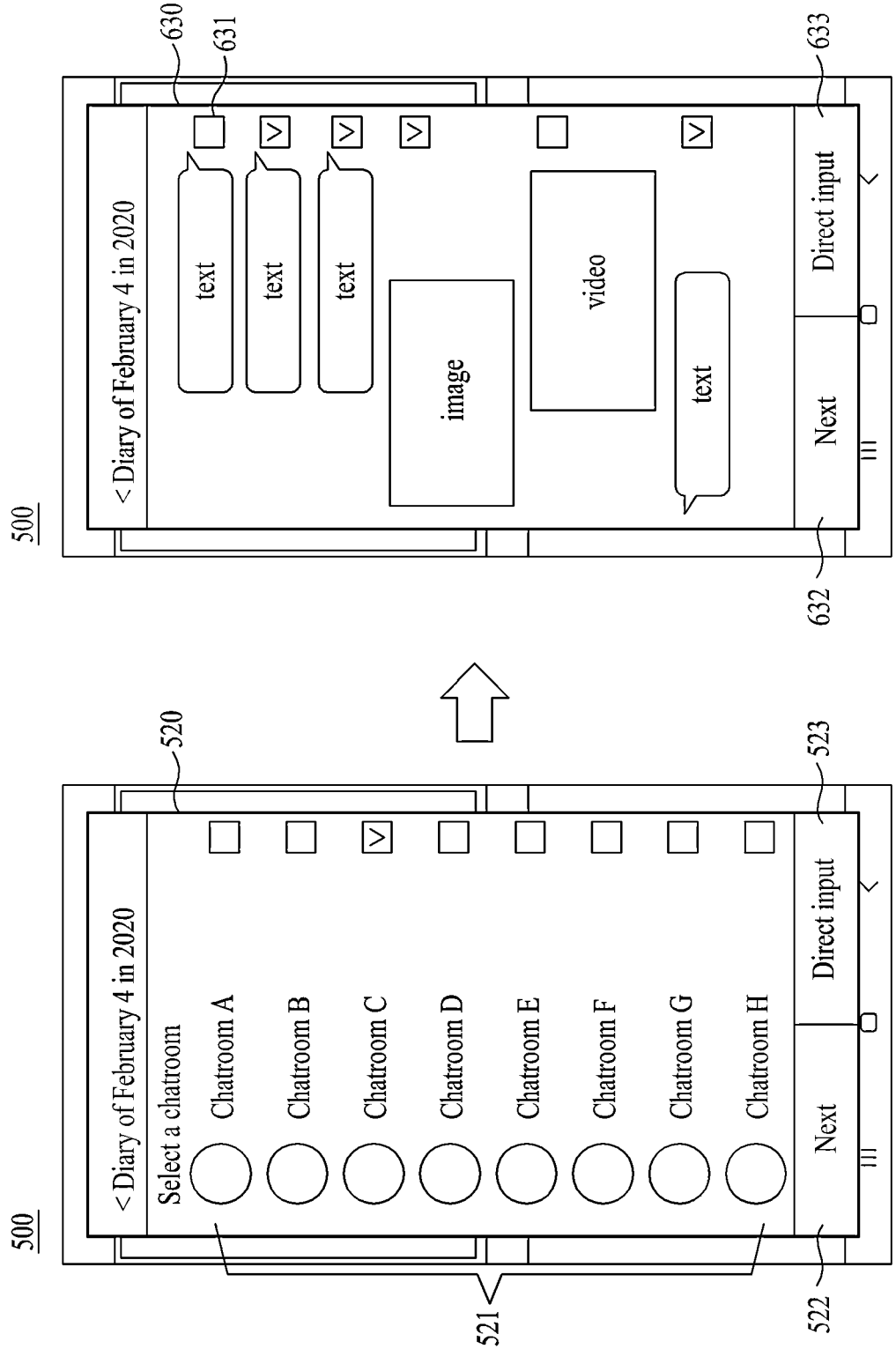

Referring to FIG. 6, in response to a selection on a specific chatroom from the chatroom list 521 and then a selection on the "next" menu 522, the processor 212 may provide a selected chatroom screen 630. Messages exchanged on a date selected on the calendar screen 500 may be displayed on the chatroom screen 630.

In some example embodiments, a message that includes a date selected on the calendar screen 500 or a period including the selected date may be displayed on the chatroom screen 630 through scroll to a location of the corresponding message. The chatroom screen 630 may include a selection input interface 631 for an individual selection for each message unit. The user may select at least a portion of messages exchanged through a corresponding chatroom as content desired to include in a diary using the selection input interface 631. The chatroom screen 630 may include a "next" menu 632 for moving to a subsequent process after selecting a message and a "direct input" menu 633 for directly inputting content without using a chatroom.

Although not illustrated, a message selection screen for selecting a message transmitted and received through the messenger may be provided in response to a selection on the "diary" menu 512 of FIG. 5. The message selection screen may include a message list. Here, the message list may be configured to select at least a portion of the entire messages of the messenger. As another example, the message list may include messages exchanged on a date selected on the calendar screen 500 from among the messages transmitted and received through the messenger. As another example, the message list may include a message that includes a date selected on the calendar screen 500. The message selection screen may include a "next" menu for moving to a chatroom in which a message selected from the message list is transmitted and received and a "direct input" menu for directly inputting content without using a chatroom. In response to a selection on a specific message from the message list and then a selection on the "next" menu 522, the processor 212 may provide the chatroom screen 630 about a chatroom in which the selected specific message is transmitted and received. The message selected from the message list may be displayed on the chatroom screen 630. A message that includes a date selected on the calendar screen 500 or a period including the selected date may be displayed on the chatroom screen 630 through a scroll to a location of the corresponding message.

Figure 7:
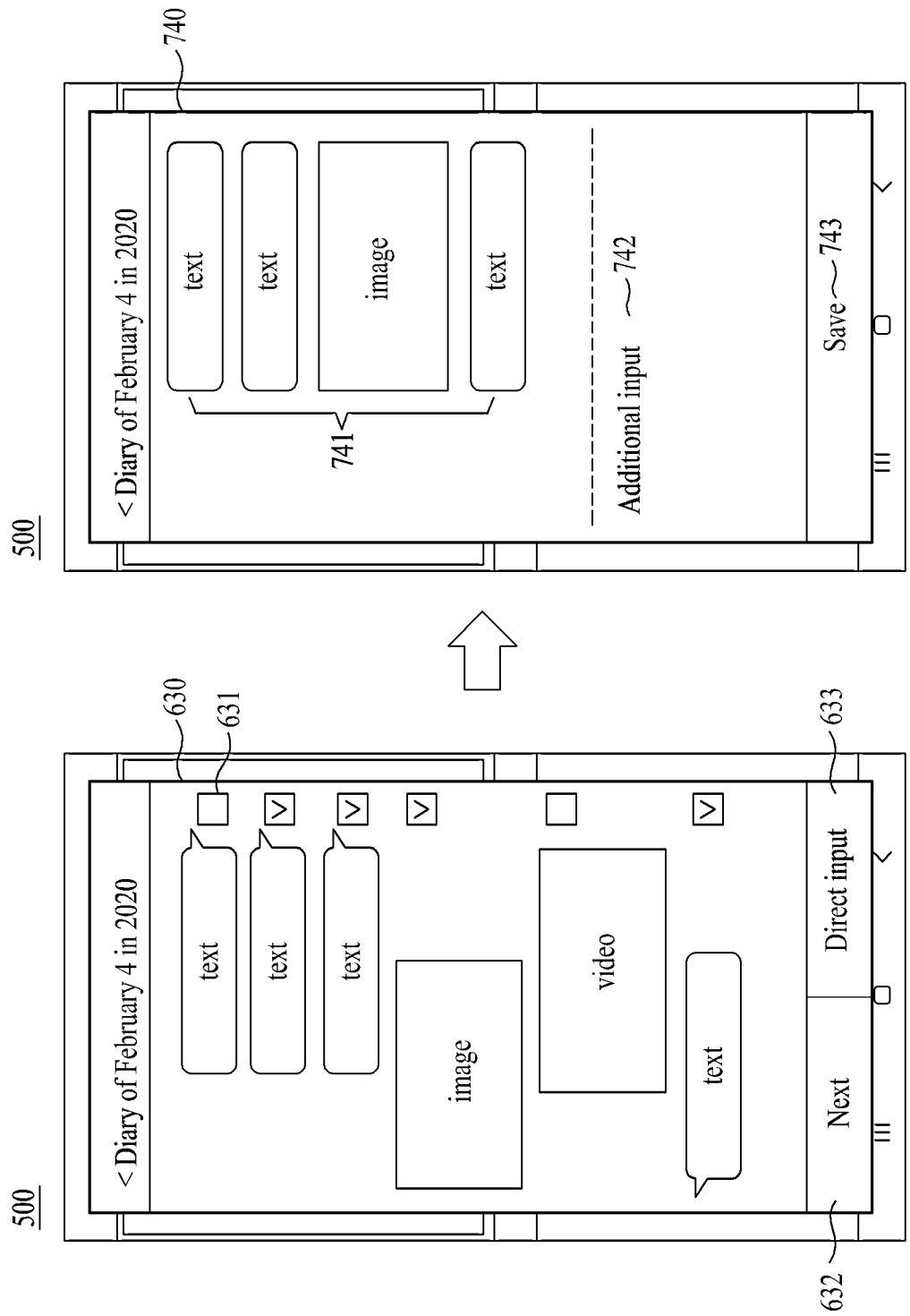

Referring to FIG. 7, in response to a selection on at least one message on the chatroom screen 630 and then a selection on the "next" menu 632, the processor 212 may provide a diary creation screen 740 that includes messages 741 selected on the chatroom screen 630. The messages 741 selected on the chatroom screen 630 may be sorted based on a predetermined (or, alternatively, desired) criterion and displayed on the diary creation screen 740. In addition to the messages 741 selected on the chatroom screen 630, the diary creation screen 740 may further include an "additional input" menu 742 for additionally inputting content desired to include in a diary.

In response to a selection on a "save" button 743 on the diary creation screen 740, the processor 212 may create a document that includes the messages 741 selected on the chatroom 630 and data input through the "additional input" interface 742 as a diary of a date selected on the calendar screen 500.

Figure 8:
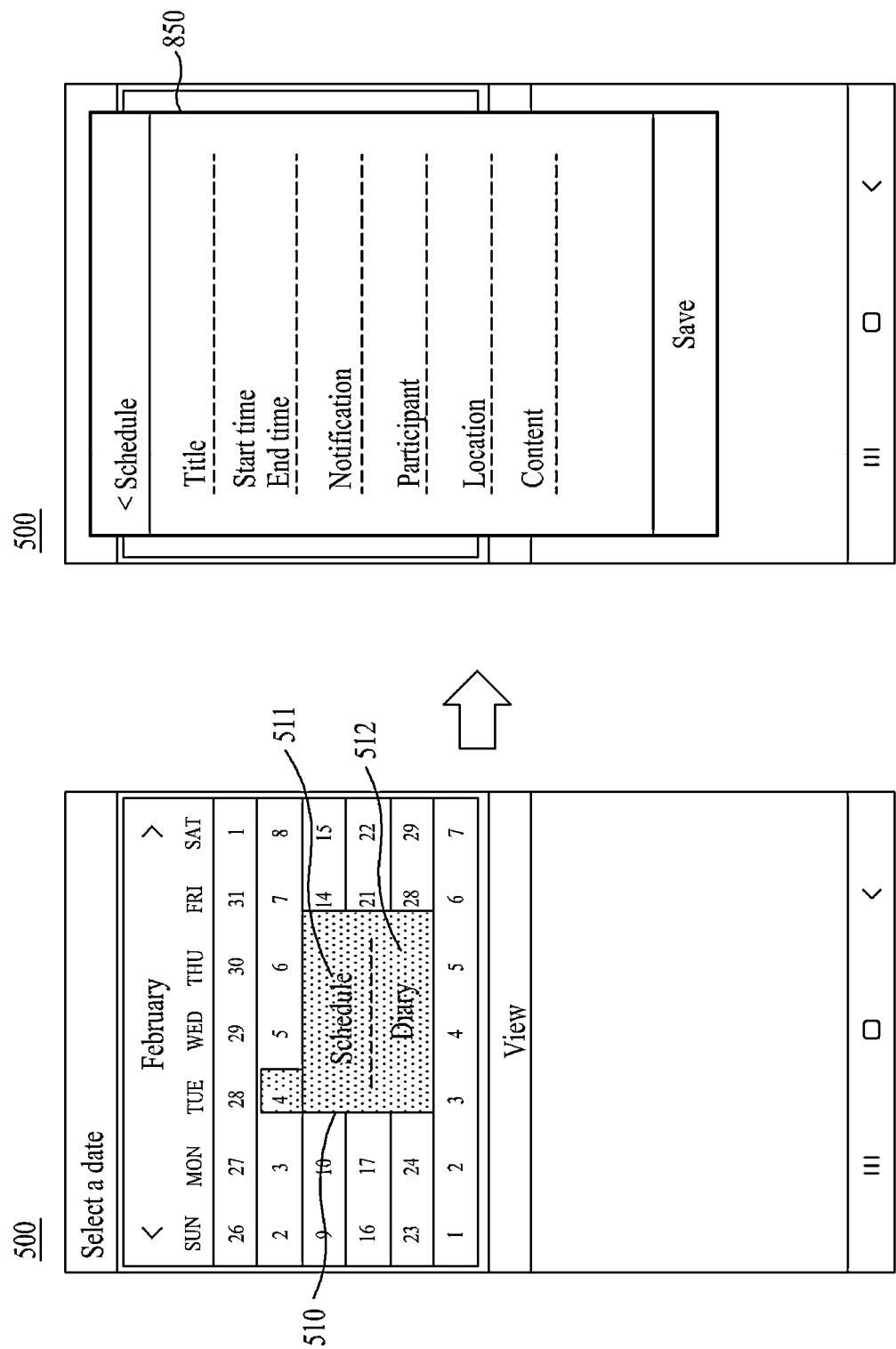

Referring to FIG. 8, in response to a selection on a specific date on the calendar screen 500 and then a selection on the "schedule" menu 511 from the menu list 510, the processor 212 may provide a schedule registration screen 850 for registering a schedule. The schedule registration screen 850 may include an interface capable of inputting a title, a start time and an end time, a notification, a participant, a location, and content of the schedule.

Figure 9:
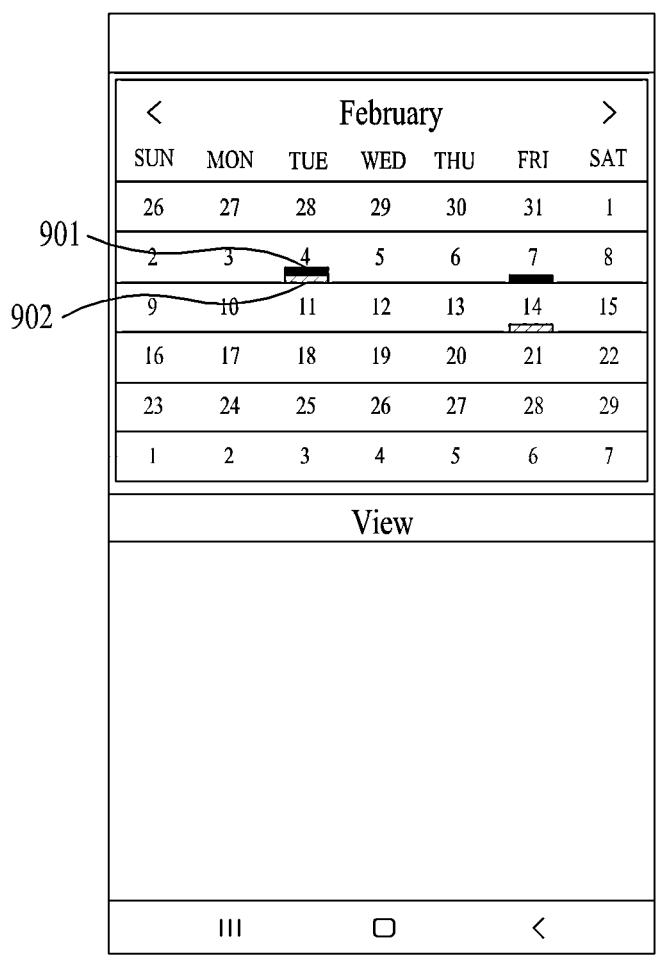

Referring to FIG. 9, the processor 212 may display a schedule indicator 901 indicating presence of a schedule and a diary indicator 902 indicating presence of a diary for each date on the calendar screen 500. Content, for example, a schedule and a diary, included in the calendar may be displayed on the calendar screen 500 using different color or shape of an indicator for each category. The schedule and the diary may be distinguished from each other. Also, even in the schedule, a schedule in which the user participates, a friend birthday registered to the messenger, a schedule of an affiliate company, and a national event may be distinguishably displayed using a different color or shape of an indicator.

Figure 10:
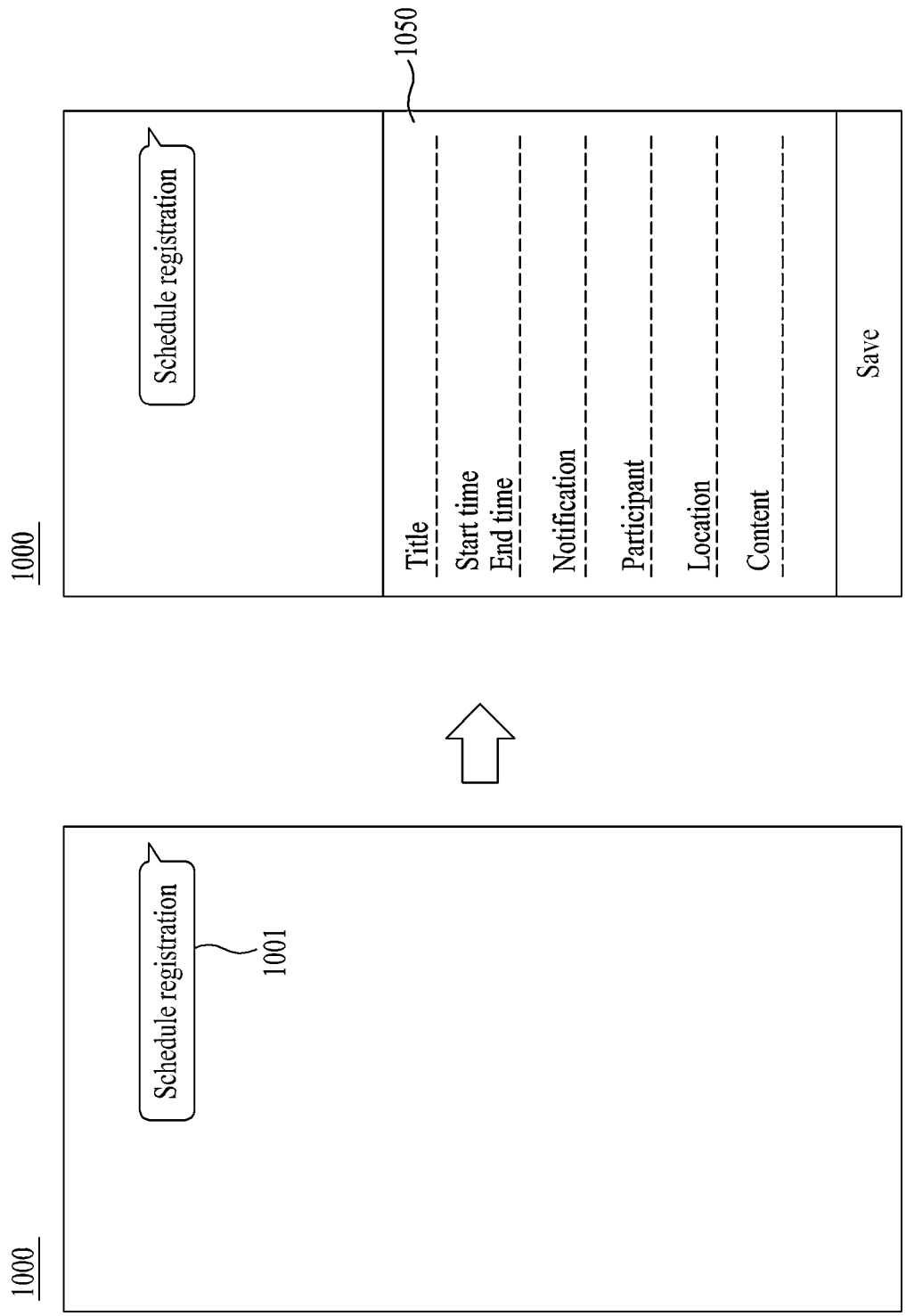
Figure 11:
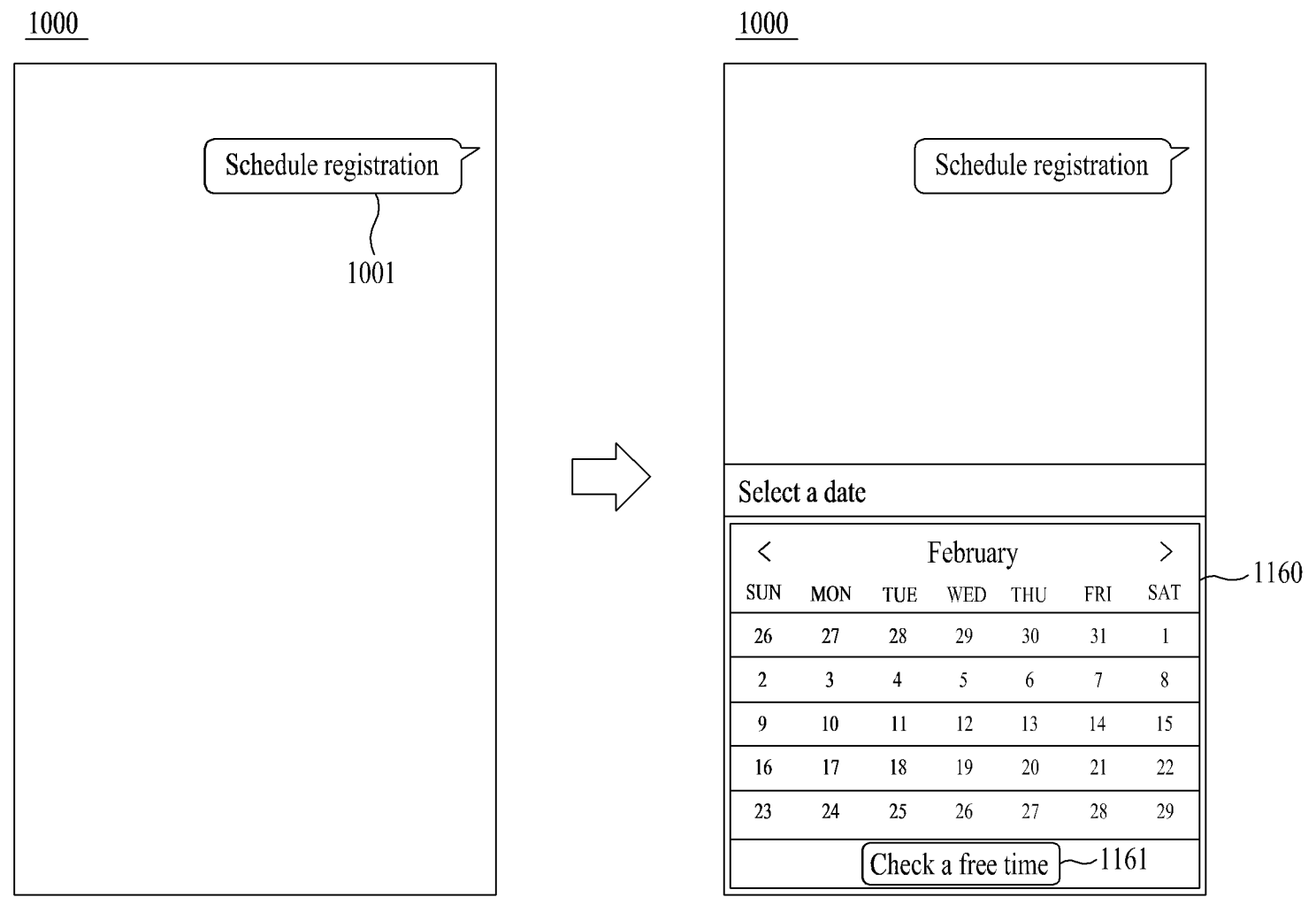

FIGS. 10 and 11 illustrate examples of a user interface screen for describing a process of registering a schedule through linkage to a messaging platform according to at least one example embodiment.

FIGS. 10 and 11 illustrate a chatroom screen 1000 of a messenger as an example of the messaging platform, which may be a screen displayed on a display of the electronic device 110.

The processor 212 may enter the calendar screen 500 in the messaging platform through interaction with the messaging platform such as a messenger. For example, a profile or a chatroom and a linked service list of the messenger may include an interface for entering the calendar screen 500.

Referring to FIG. 10, in response to an input of a keyword 1001 related to a schedule on the chatroom screen 1000, the processor 212 may recognize the input of the keyword 1001 as a calendar call event and may provide a schedule registration screen 1050 that includes a schedule registration form. That is, when the keyword 1001 related to the schedule is recognized on the chatroom screen 1000, the processor 212 may automatically call the calendar and may provide the schedule registration screen 1050. Here, the schedule registration screen 1050 may include an interface capable of inputting a title, a start time and an end time, a notification, a participant, a location, and content of a schedule.

The processor 212 may analyze a previous message of a desired period of time, for example, 1 hour, based on a point in time at which the calendar call event is recognized and may provide recommendation information about a period to be registered based on a message including a time or a date. For example, if a specific date, such as February 5 and February 8, is included in a recent conversation of the chatroom screen 1000, the processor 212 may automatically input the corresponding date on the schedule registration screen 1050. Also, the processor 212 may analyze a message on the chatroom screen 1000 and may also recommend analysis results as content of the schedule. For example, the processor 212 may acquire a start time ("4 pm on February 5") and an end time ("6 pm on February 5") of a schedule and content ("study") of the schedule from a message "There is a study from 4 μm to 6 pm on February 5" and may automatically input the same on the schedule registration screen 1050.

If the user desires to enter the calendar and to register a schedule through a chatroom, the processor 212 may register a member included in the chatroom as a participant of the corresponding schedule. Referring to FIG. 11, in response to an input of the keyword 1001 related to a schedule on the chatroom screen 1000, the processor 212 may provide a date selection screen 1160 prior to providing the schedule registration screen 1050. The date selection screen 1160 may include a "check free time" menu 1161 for verifying a free time in which an overlapping schedule is absent between schedule participants.

The processor 212 may verify a calendar of each member registered as a schedule participant through the server 150 and may provide a free time in which the overlapping schedule is absent. In response to a selection on the "check free time" menu 1161 on the date selection screen 1160, the processor 212 may display all of schedules of schedule participants on the calendar of the date selection screen 1160. The processor 212 may display contents of schedules of other participants aside from the user through blind processing. In response to a selection on a specific date on the date selection screen 1160, the processor 212 may display a free time in which an overlapping schedule is absent between members for each time zone of the corresponding date. In response to a selection on a free time on the date selection screen 1160, the processor 212 may provide the schedule registration screen 1050 that includes a schedule registration form as shown in FIG. 10. Here, a free time selected by the user may be automatically input on the schedule registration screen 1050.

In response to completion of the schedule registration through linkage to the calendar in the chatroom, the processor 212 may forward the corresponding schedule to schedule participants. Here, each of the schedule participants may select one of accept, hold, and refuse with respect to the schedule and may reply. If not reply, the corresponding schedule participant may maintain a hold state as a default value.

Figure 12:
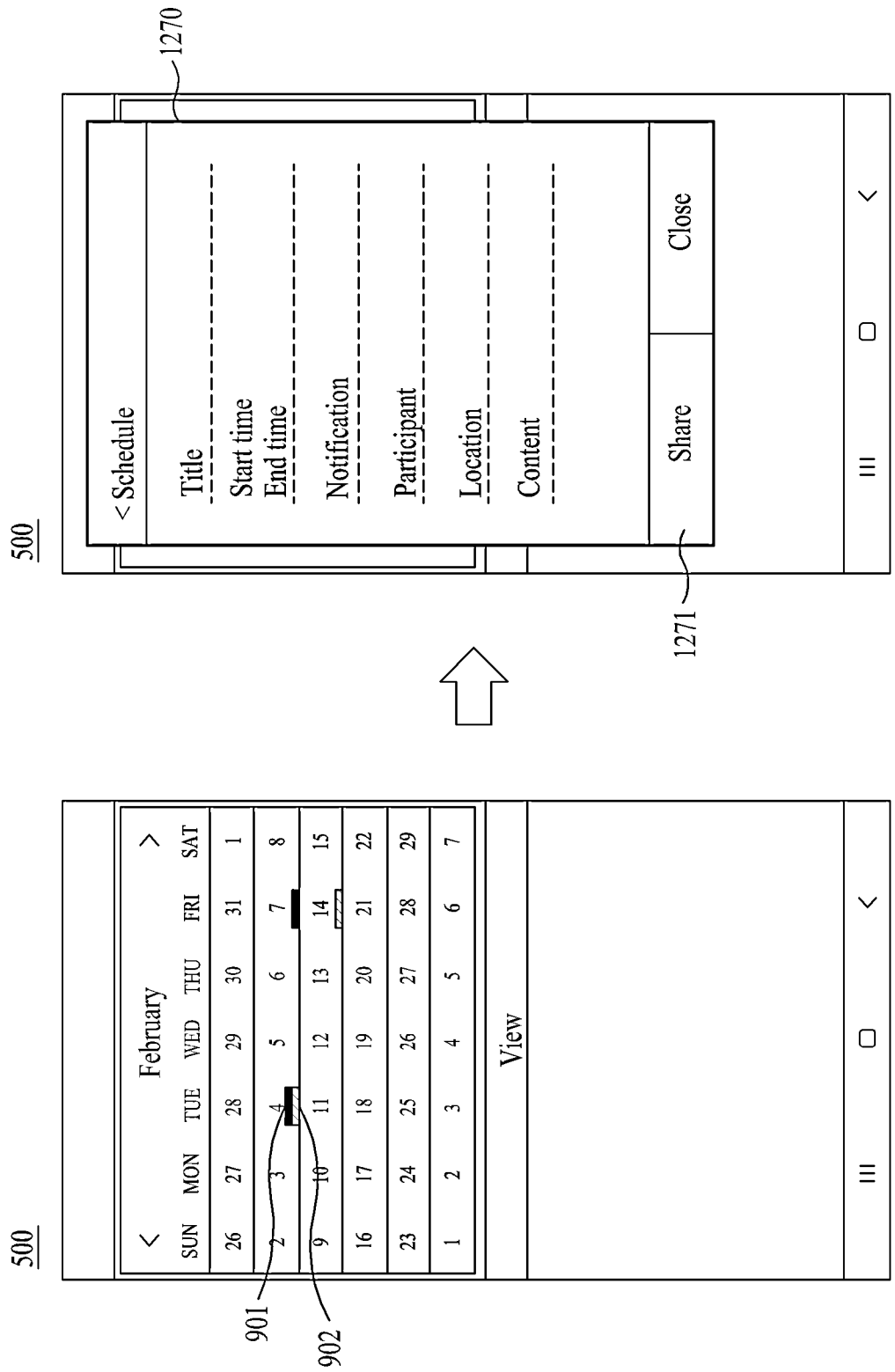

FIGS. 12 and 13 illustrate examples of a user interface screen for describing a process of sharing a calendar through a messaging platform according to at least one example embodiment.

The processor 212 may share a schedule or a diary registered to a calendar with another user through a messenger. Referring to FIG. 12, in response to a selection on the schedule indicator 901 of a specific date on the calendar screen 500, the processor 212 may provide a schedule verification screen 1270 for verifying details of a corresponding schedule. The schedule verification screen 1270 may include a title, a start time and an end time, a notification, a participant, a location, and content of the schedule, and may include a "share" menu 1271 for sharing the corresponding schedule. Likewise, referring to FIG. 13, in response to a selection on the diary indicator 902 of a specific date on the calendar screen 500, the processor 212 may provide a diary verification screen 1380 for verifying diary content of the specific date. A diary document created through a chatroom of the messenger or a direct input may be displayed on the diary verification screen 1380. The diary verification screen 1380 may include a "share" menu 1381 for sharing the corresponding diary. Although not illustrated, when content, such as a text or an image, displayed on the diary verification screen 1380 is stored in association with a chatroom of the messenger, a link, such as a uniform resource locator (URL), capable of moving from the corresponding content to the linked chatroom may be provided.

In response to a selection on the "share" menu 1271 on the schedule verification screen 1270 or in response to a selection on the "share" menu 1381 on the diary verification screen 1380, the processor 212 may provide a chatroom list of the messenger and may share the corresponding schedule or diary through a specific chatroom selected from the chatroom list.

The schedule verification menu 1270 may further include a menu for deleting a schedule, a menu for editing the schedule, and the like. Likewise, the diary verification menu 1380 may further include menus for deleting or editing a diary.

According to example embodiments, it is possible to link a diary document created based on data included in a messaging platform to a calendar for schedule management and provide a calendar capable of managing schedules created in all of chatrooms of a messenger at a single location. By directly linking a diary document created based on data included in a messaging platform to a calendar for schedule management, less computing resources may be used to calendar an event based on data exchanged in a messaging platform.

The systems or apparatuses described above may be implemented using hardware components, or a combination of hardware components and software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable storage mediums.

The methods according to the above-described example embodiments may be configured in a form of program instructions performed through various computer devices and recorded in non-transitory computer-readable media. The media may also include, alone or in combination with the program instructions, data files, data structures, and the like. The media may continuously store computer-executable programs or may temporarily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store and perform program instructions, such as ROM, RAM, flash memory, and the like. Examples of other media may include recording media and storage media managed by an app store that distributes applications or a site, a server, and the like that supplies and distributes other various types of software.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

What is claimed is:

1. A diary addition method performed by a computer apparatus comprising at least one processor configured to execute computer-readable instructions comprised in a memory, the diary addition method comprising:
    allowing, by the at least on processor, a user to select a specific period on a calendar displayed on a calendar screen;
    providing, by the at least on processor, a menu list including a schedule menu for displaying a schedule registration screen and a diary menu for displaying a chatroom selection screen, the chatroom selection screen including a chatroom list that includes entire chatrooms of a messaging platform or one or more chatrooms of the messaging platform, the one or more chatrooms being chatrooms in which one or more messages have been exchanged on the selected specific period;
    displaying, by the at least on processor, the chatroom selection screen including the chatroom list in response to a selection of the diary menu;
    displaying, by the at least on processor, one or more messages exchanged during the selected specific period in a specific chatroom in response to the user selecting the specific chatroom from the chatroom list included in the chatroom screen;
    providing, by the at least one processor, an interface configured to allow the user to select individual messages among the displayed one or more messages that have been exchanged during the selected specific period in the specific chatroom;
    creating, by the at least one processor, a diary document based on the individual messages selected through the interface; and
    adding the diary document to the calendar in association with the specific period.

2. The diary addition method of claim 1, wherein the specific chatroom is a chatroom in the chatroom list, the specific chatroom being a chatroom in which the specific period is described.

3. The diary addition method of claim 1, wherein the interface further includes a second interface configured to capture a portion of the displayed one or more messages exchanged during the selected specific period in a specific chatroom.

4. The diary addition method of claim 1, wherein the creating comprises:
    creating the diary document by sorting the individual messages selected through the interface by data type or by sorting the individual messages selected through the interface based on data selection order or data timeline information.

5. The diary addition method of claim 1, further comprising:
    sharing, by the at least one processor, at least one diary document among one or more diary documents added to the calendar, through the messaging platform.

6. The diary addition method of claim 1, further comprising:
    recognizing, by the at least one processor, an input of a keyword as a calendar call event and providing a schedule registration form, in response to the input of the keyword related to a schedule through the messaging platform.

7. The diary addition method of claim 6, wherein the providing a schedule registration form comprises registering a member included in the messaging platform as a participant of the schedule.

8. The diary addition method of claim 6, wherein the providing a schedule registration form comprises:
    verifying a calendar of each member included in the messaging platform; and
    providing a free time in which schedules of corresponding registered members do not overlap each other.

9. The diary addition method of claim 6, wherein the providing a schedule registration form comprises:
    analyzing data corresponding to a period of time based on a point in time at which the calendar call event is recognized; and
    providing recommendation information about a period to be registered to the schedule.

10. The diary addition method of claim 6, further comprising:
    adding, by the at least one processor, a chatbot linked to the calendar, to the messaging platform.

11. The diary addition method of claim 10, wherein the chatbot is configured to provide a notification message about the schedule registered to the calendar through the messaging platform.

12. The diary addition method of claim 10, wherein the chatbot is configured to:
    analyze a desired pattern of the schedule registered to the calendar; and
    provide a message that recommends registration of the schedule having the desired pattern through the messaging platform.

13. A non-transitory computer-readable record medium storing instructions that, when executed by a processor, cause a computer apparatus including the processor to perform the diary addition method of claim 1.

14. The diary addition method of claim 1, further comprising:
    displaying, by the at least one processor, both a schedule indicator indicating presence of a schedule and a diary indicator indicating a presence of a diary on the calendar screen to be distinguished from each other.

15. A computer apparatus comprising:
    at least one processor configured to execute computer-readable instructions comprised in a memory, wherein the at least one processor is configured to cause the computer apparatus to,
allow a user to select a specific period on a calendar displayed one a calendar screen,
provide a menu list including a schedule menu for displaying a schedule registration screen and a diary menu for displaying a chatroom selection screen, the chatroom selection screen including a chatroom list that includes entire chatrooms of a messaging platform or one or more chatrooms of the messaging platform, the one or more chatrooms being chatrooms in which one or more messages have been exchanged on the selected specific period,
display the chatroom selection screen including the chatroom list in response to a selection of the diary menu,
display one or more messages exchanged during the selected specific period in a specific chatroom in response to the user selecting the specific chatroom from the chatroom list included in the chatroom screen,
provide an interface configured to allow the user to select individual messages among the displayed one or more messages that have been exchanged during the selected specific period in the specific chatroom create a diary document based on data the individual messages through the interface, and
add the diary document to the calendar in association with the specific period.

16. The computer apparatus of claim 15, wherein the specific chatroom is a chatroom in the chatroom list, the specific chatroom being a chatroom in which the specific period is described.

17. The computer apparatus of claim 15, wherein the at least one processor is further configured to cause the computer apparatus to:
share at least one diary document among one or more diary documents added to the calendar, through the messaging platform.

18. The computer apparatus of claim 15, wherein the at least one processor is further configured to cause the computer apparatus to:
recognize an input of a keyword as a calendar call event and provide a schedule registration form, in response to the input of the keyword related to a schedule through the messaging platform.

19. The computer apparatus of claim 18, wherein the at least one processor is further configured to cause the computer apparatus to:
register a member included in the messaging platform as a participant of the schedule;
verify a calendar of each member included in the messaging platform; and
provide a free time in which schedules of corresponding registered members do not overlap each other.

20. The computer apparatus of claim 15, wherein the at least one processor is further configured to cause the computer apparatus to:
display a schedule indicator indicating presence of a schedule and a diary indicator indicating a presence of a diary on the calendar screen to be different from each other.

* * * * *